(12) United States Patent
Preston et al.

(10) Patent No.: US 8,660,819 B2
(45) Date of Patent: Feb. 25, 2014

(54) UTILIZATION OF HFR-BASED CATHODE INLET RH MODEL IN COMPARISON TO SENSOR FEEDBACK TO DETERMINE FAILED WATER VAPOR TRANSFER UNIT AND UTILIZE FOR A DIAGNOSTIC CODE AND MESSAGE

(75) Inventors: Todd K. Preston, Rochester, NY (US); Sergio E. Garcia, Webster, NY (US); Joe C. Machuca, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 13/197,535

(22) Filed: Aug. 3, 2011

(65) Prior Publication Data

US 2013/0035898 A1    Feb. 7, 2013

(51) Int. Cl.
*G06F 11/30*    (2006.01)

(52) U.S. Cl.
USPC .......................................................... 702/183

(58) Field of Classification Search
USPC .......................................................... 702/183
See application file for complete search history.

(56) References Cited

U.S. PATENT DOCUMENTS

| | | | |
|---|---|---|---|
| 2009/0075127 A1* | 3/2009 | Lienkamp et al. | 429/13 |
| 2011/0113857 A1 | 5/2011 | Sinha | |

* cited by examiner

*Primary Examiner* — Stephen Cherry
(74) *Attorney, Agent, or Firm* — John A. Miller; Miller IP Group, PLC

(57) ABSTRACT

A system and method for determining whether there is a cross-over leak, or other failure, in a WVT unit that humidifies the cathode inlet airflow to a fuel cell stack in a fuel cell system. The fuel cell system includes an HFR circuit that determines the humidity level of the membranes in the fuel cell stack and an RH sensor that measures the relative humidity of the airflow to the cathode side of the fuel cell stack. The HFR humidity calculation is compared to RH measurements from the RH sensor, and if the difference between the two RH values is greater than a predetermined calibration value, then the system may determine that the WVT unit is failing and needs to be serviced or replaced.

18 Claims, 1 Drawing Sheet

UTILIZATION OF HFR-BASED CATHODE INLET RH MODEL IN COMPARISON TO SENSOR FEEDBACK TO DETERMINE FAILED WATER VAPOR TRANSFER UNIT AND UTILIZE FOR A DIAGNOSTIC CODE AND MESSAGE

BACKGROUND OF THE INVENTION

1. Field of the Invention

This invention relates generally to a system and method for determining whether a water vapor transfer (WVT) unit in a fuel cell system is operating properly and, more particularly, to a system and method for determining whether a WVT unit in a fuel cell system has cross-over leaks by comparing an output of a relative humidity (RH) sensor that measures the relative humidity in a cathode input line to a fuel cell stack and an RH value provided by a high frequency resistance (HFR) circuit that determines membrane humidity of the membranes within the fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels.

The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

As mentioned above, water is generated as a by-product of the stack operation. Therefore, the cathode exhaust gas from the stack will typically include significant water vapor and liquid water. It is known in the art to employ a water vapor transfer (WVT) unit to capture some of the water vapor in the cathode exhaust gas, and use the water vapor to humidify the cathode input airflow. Water in the cathode exhaust gas at one side of the water transfer elements within the WVT unit, such as membranes, is absorbed by the water transfer elements and transferred to the cathode air stream at the other side of the water transfer elements.

As discussed above, it is generally necessary to control stack humidity so that the membranes in the stack have the proper electrical conductivity, but where the flow channels do not become blocked by ice if the water freezes during system shut-down. It is known in the art to provide an RH sensor in the cathode air inlet of a fuel cell system to measure the humidification of the cathode inlet gas stream as it enters the stack. Using the measured inlet relative humidity and the water specie balance, or mass balance of water, the RH profile of the fuel cell system, including cathode air outlet flow, can be estimated. The ability of the RH sensor to provide an accurate reading of the RH is determined by the cost and complexity of the sensor. It is typical desirable to limit the cost of the sensor, which reduces its accuracy.

A technique for determining membrane humidification is known in the art as high frequency resistance (HFR) humidification measuring. HFR humidification measurements are generated by providing a high frequency component or signal on the electrical load of the stack so that a high frequency ripple is produced on the current output of the stack. The resistance of the high frequency component is then measured by a detector, which is a function of the level of humidification of the membranes in the stack. High frequency resistance is a well-known property of fuel cells, and is closely related to the ohmic resistance, or membrane protonic resistance, of the fuel cell membrane. Ohmic resistance is itself a function of the degree of fuel cell membrane humidification. Therefore, by measuring the HFR of the fuel cell membranes of a fuel cell stack within a specific band of excitation current frequencies, the degree of humidification of the fuel cell membrane may be determined. This HFR measurement allows for an independent measurement of the fuel cell membrane humidification, which may eliminate the need for RH sensors.

A typical WVT unit includes membranes made of a special material where the wet flow on one side of the membrane is transferred through the membrane to humidify the dry flow on the other side of the membrane. Because the material that makes up the membranes is relatively thin and the pressure on the cathode inlet side provided by the compressor is higher than the pressure at the cathode outlet side, WVT units sometimes fail where holes form in the membranes so that the airflow on the input side of the WVT unit flows directly to the output side of the WVT unit without passing through the fuel cell stack. Because there is a loss of airflow into the fuel cell stack, the oxygen that is available in the fuel cell stack to provide the reaction is reduced, which reduces the performance of the stack. Further, less airflow through the cathode flow channels as a result of the airflow cross-over reduces the amount of airflow that is able to remove water from the cathode flow channels, also affecting stack performance. Further, if the relative humidity of the cathode inlet air is different than what is detected, the cathode stoichiometry will be different than what is expected, which also affects stack performance.

SUMMARY OF THE INVENTION

In accordance with the teachings of the present invention, a system and method are disclosed for determining whether there is a cross-over leak, or other failure, in a WVT unit that humidifies the cathode inlet airflow to a fuel cell stack in a fuel cell system. The fuel cell system includes an HFR circuit that determines the humidity level of the membranes in the fuel cell stack and an RH sensor that measures the relative humidity of the airflow to the cathode side of the fuel cell stack. The HFR humidity calculation is compared to RH measurements from the RH sensor, and if the difference between the two RH values is greater than a predetermined calibration value, then the system may determine that the WVT unit is failing and needs to be serviced or replaced.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether a WVT unit that humidifies cathode inlet air provided to a fuel cell system has failed or is failing is merely exemplary in nature, and is in no way intended to limit the invention or its applications or uses.

Figure 1:
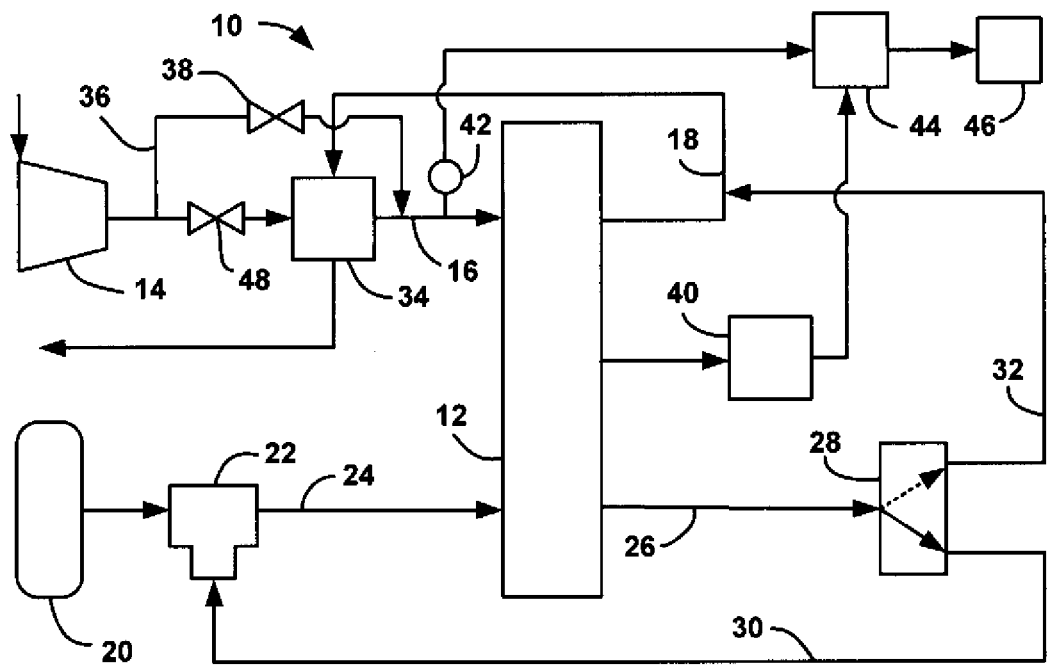
FIG. 1 is a simplified schematic block diagram of a fuel cell system.

FIG. 1 is a schematic block diagram of a fuel cell system 10 including a fuel cell stack 12. A compressor 14 provides an airflow to the cathode side of the fuel cell stack 12 on a cathode input line 16 through a valve 48 and a water vapor transfer (WVT) unit 34 that humidifies the cathode input air. A cathode exhaust gas is output from the stack 12 on a cathode exhaust gas line 18 that directs the cathode exhaust gas to the WVT unit 34 to provide the humidity to humidify the cathode input air. A by-pass line 36 is provided around the WVT unit 34 to direct some or all of the cathode input airflow around the WVT unit 34. A by-pass valve 38 is provided in the by-pass line 36, where the positions of the valve 48 and the by-pass valve 38 are controlled to selectively direct the cathode inlet airflow through or around the WVT unit 34 so that when the airflow through the WVT unit 34 and the by-pass line 36 are mixed, the desired or proper amount of humidification is provide to the cathode input airflow, which changes as the stack current density changes. An RH sensor 42 is provided in the cathode input line 16 to provide an RH measurement of the cathode input airflow after it has been humidified by the WVT unit 34.

The fuel cell system 10 also includes a source 20 of hydrogen fuel or gas, typically a high pressure tank, that provides the hydrogen gas to an injector 22 that injects a controlled amount of the hydrogen gas to the anode side of the fuel cell stack 12 on an anode input line 24. Although not specifically shown, one skilled in the art would understand that various pressure regulators, control valves, shut-off valves, etc. would be provided to supply the high pressure hydrogen gas from the source 20 at a pressure suitable for the injector 22. The injector 22 can be any injector suitable for the purposes discussed herein. One example is an injector/ejector as described in U.S. Pat. No. 7,320,840, titled Combination of Injector/Ejector for Fuel Cell Systems, issued Jan. 22, 2008, assigned to the assignee of this application and herein incorporated by reference.

An anode effluent output gas is output from the anode side of the fuel cell stack 12 on an anode output line 26, which is provided to a bleed valve 28. As is well understood by those skilled in the art, nitrogen cross-over from the cathode side of the fuel cell stack 12 dilutes the hydrogen gas in the anode side of the stack 12, thereby affecting fuel cell stack performance. Therefore, it is necessary to periodically bleed the anode effluent gas from the anode sub-system to reduce the amount of nitrogen in the anode sub-system. When the system 10 is operating in a normal non-bleed mode, the bleed valve 28 is in a position where the anode effluent gas is provided to a recirculation line 30 that recirculates the anode gas to the injector 22 to operate it as an ejector and provide recirculated hydrogen gas back to the anode input of the stack 12. When a bleed is commanded to reduce the nitrogen in the anode side of the stack 12, the bleed valve 28 is positioned to direct the anode effluent to a by-pass line 32 that combines the anode effluent gas with the cathode exhaust gas on the line 18, where the hydrogen gas is diluted to be suitable for the environment. Although the system 10 is an anode recirculation system, the present invention will have application for other types of fuel cell systems including anode flow shift-systems, as would be well understood to those skilled in the art.

The fuel cell system also includes an HFR circuit 40 that determines stack membrane humidity of the membranes in the stack 12 in a manner that is well understood by those skilled in the art. The HFR circuit 40 determines the high frequency resistance of the fuel cell stack 12 that is then used to determine the humidification of the cell membranes within fuel cell stack 12. The HFR circuit 40 operates by determining the ohmic resistance, or membrane protonic resistance, of the fuel cell stack 12. Membrane protonic resistance is a function of membrane humidification of the fuel cell stack 12.

The present invention proposes a system and method for determining whether the WVT unit 34 has a cross-over leak, or other failure, or is beginning to fail. In this embodiment, the system 10 includes a processor 44 that determines whether a WVT unit failure may be occurring. The processor 44 receives an RH measurement signal from the RH sensor 42 and an HFR-based relative humidity signal from the circuit 40 that gives a representation of the humidity level of the membranes in the fuel cell stack 12. The two values are compared in the processor 44, and if the difference is greater than a predetermined allowable calibration value, then a potential WVT unit failure may be occurring, which can be provided to a warning device 46, such as a light.

The HFR circuit 40 will detect the actual humidity of the membranes irregardless of the whether there is a cross-over leak in the WVT unit 34 so that if there is less flow as a result of the cross-over, the membranes will actually get wetter at the same stack current density. However, the RH sensor 42 in the cathode input line 16 will provide an HR measurement that is less because there is less humidity in the cathode inlet as a result of the cross-over.

Figure 2:
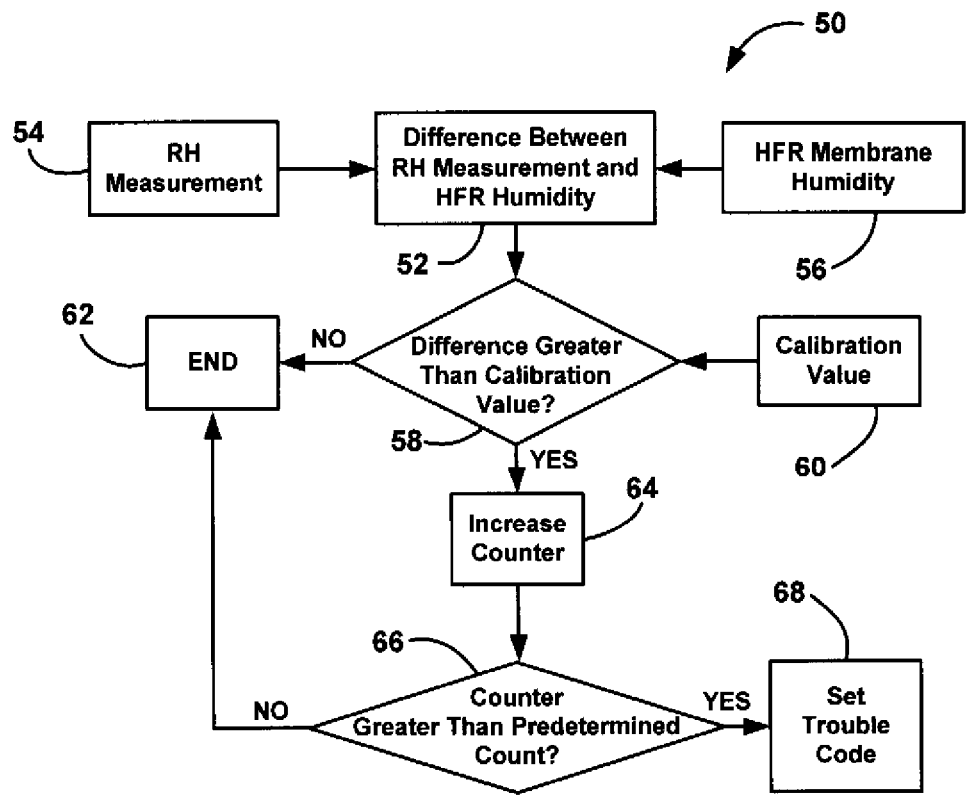
FIG. 2 is a flow chart diagram showing a process for determining a potential failure in the WVT unit based on a comparison between an HFR calculation and RH sensor measurement.

FIG. 2 is a flow chart diagram 50 showing a process for determining whether there is a cross-over leak, or some other potential failure, in the WVT unit 34, where the humidified airflow on the cathode input line 16 is lower than what is expected and/or desired. The process for determining whether there is a cross-over leak, or some other potential failure, in the WVT unit 34 can be performed at any suitable time, such as at system start-up, or as often as deemed appropriate, which may increase as the system ages.

At box 52, the algorithm determines a difference between the RH measurement from the sensor 42 provided at box 54 and the HFR membrane humidity calculation from the circuit 40 provided at box 56. The difference between these two RH values is provided to a decision diamond 58 that determines whether the difference is greater than a predetermined humidity calibration value provided at box 60. The humidity calibration value may be different for different fuel cell systems. The humidity calibration value can be determined by any suitable technique, and can be fixed or can vary depending on stack operation conditions. In one non-limiting embodiment, the calibration value is set at 20% of the HFR membrane humidity calculation value. The calibration value can be the same across the entire current density output of the fuel cell stack 12 or can increase as the current density of the fuel cell stack 12 increases, where more humidification may be necessary for a proper operation of the stack 12.

If the difference between the two RH values is not greater than the calibration value at the decision diamond 58, then the algorithm terminates at box 62 indicating that there is not a problem with WVT unit 34. If the difference between the RH values is greater than the calibration value at the decision diamond 58, then the algorithm increases a counter value at box 64, and then determines whether the counter value is greater than a predetermined count, which may be one or some other suitable value, at decision diamond 66. If the counter value is not greater than the predetermined count at the decision diamond 66, then the algorithm does not issue a fault, and terminates at the box 62. If the counter value has exceeded the predetermined count at the decision diamond 66, then the algorithm sets a diagnostic trouble code (DTC) at box 68, which can be provided by a trouble light on the dashboard of the vehicle, indicating that the WVT unit 34 may be failing and service should be performed.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a water vapor transfer (WVT) unit that humidifies a cathode airflow to a fuel cell stack in a fuel cell system has failed or is failing, said method comprising:
   measuring relative humidity (RH) of the cathode airflow provided from the WVT unit to the fuel cell stack to provide a first RH value;
   calculating a high frequency resistance relative humidity of membranes in the fuel cell stack using a high frequency resistance (HFR) circuit to provide a second RH value;
   comparing the first RH value to the second RH value to generate an RH value difference;
   providing a calibration value;
   comparing the RH value difference to the calibration value; and
   determining that the WVT unit has failed or is failing if the RH difference value is greater than the calibration value.

2. The method according to claim 1 wherein providing a calibration value includes providing a calibration value that is the same across all stack current densities.

3. The method according to claim 1 wherein providing a calibration value includes providing a calibration value that increases as stack current density is increased.

4. The method according to claim 1 wherein providing a calibration value includes providing a calibration value that is about 20% of the calculated high frequency resistance relative humidity.

5. The method according to claim 1 wherein measuring the relative humidity (RH) of the cathode airflow includes using an RH sensor.

6. The method according to claim 1 wherein determining that the WVT unit has failed or is failing includes determining that there is cross-over leaking of the cathode airflow from a dry side of membranes within the WVT unit to a wet side of the membranes in the WVT unit.

7. The method according to claim 1 further comprising increasing a counter value each time the RH difference value is greater than the calibration value, and only determining that the WVT unit has failed or is failing if the counter value exceeds a predetermined count value.

8. A method for determining whether a water vapor transfer (WVT) unit that humidifies a cathode airflow to a fuel cell stack in a fuel cell system has failed or is failing, said method comprising:
   measuring relative humidity (RH) of the cathode airflow provided from the WVT unit to the fuel cell stack using an RH sensor to provide a first RH value;
   calculating a high frequency resistance relative humidity of membranes in the fuel cell stack using a high frequency resistance (HFR) circuit to provide a second RH value;
   comparing the first RH value to the second RH value to generate an RH value difference;
   providing a calibration value;
   comparing the RH value difference to the calibration value;
   increasing a counter value if the RH difference value is greater than the calibration value;

determining whether the counter value is greater than a predetermined count value; and determining that the WVT unit has failed or is failing if the RH difference value is greater than the predetermined count value, wherein determining that the WVT unit has failed or is failing includes determining that there is cross-over leaking of the cathode airflow from a dry side of membranes within the WVT unit to a wet side of the membranes in the WVT unit.

9. The method according to claim 8 wherein providing a calibration value includes providing a calibration value that is the same across all stack current densities.

10. The method according to claim 8 wherein providing a calibration value includes providing a calibration value that increases as stack current density is increased.

11. The method according to claim 8 wherein providing a calibration value includes providing a calibration value that is about 20% of the calculated high frequency resistance relative humidity.

12. A system for determining whether a water vapor transfer (WVT) unit that humidifies a cathode airflow to a fuel cell stack in a fuel cell system has failed or is failing, said system comprising:

means for measuring relative humidity (RH) of the cathode airflow provided from the WVT unit to the fuel cell stack to provide a first RH value;

means for calculating a high frequency resistance (HFR) relative humidity value of membranes in the fuel cell stack to provide a second RH value;

means for comparing the first RH value to the second RH value to generate an RH value difference;

means for providing a calibration value;

means for comparing the RH value difference to the calibration value; and means for determining that the WVT unit has failed or is failing if the RH difference value is greater than the calibration value.

13. The system according to claim 12 wherein the means for providing a calibration value provides a calibration value that is the same across all stack current densities.

14. The system according to claim 12 wherein the means for providing a calibration value provides a calibration value that increases as stack current density is increased.

15. The system according to claim 12 wherein the means for providing a calibration value provides a calibration value that is about 20% of the calculated high frequency resistance relative humidity.

16. The system according to claim 12 wherein the means for measuring the relative humidity (RH) of the cathode airflow uses an RH sensor.

17. The system according to claim 12 wherein the means for determining that the WVT unit has failed or is failing determines that there is cross-over leaking of the cathode airflow from a dry side of membranes within the WVT unit to a wet side of the membranes in the WVT unit.

18. The system according to claim 12 further comprising means for increasing a counter value each time the RH difference value is greater than the calibration value, and only determining that the WVT unit has failed or is failing if the counter value exceeds a predetermined count value.

* * * * *